United States Patent
Cheung et al.

(10) Patent No.: US 9,852,177 B1
(45) Date of Patent: Dec. 26, 2017

(54) SYSTEM AND METHOD FOR GENERATING AUTOMATED RESPONSE TO AN INPUT QUERY RECEIVED FROM A USER IN A HUMAN-MACHINE INTERACTION ENVIRONMENT

(71) Applicant: KAMI INTELLIGENCE LTD, Hong Kong (HK)

(72) Inventors: Chi Leung Alex Cheung, Hong Kong (HK); Yu Fai Ho, Hong Kong (HK)

(73) Assignee: KAMI INTELLIGENCE LTD, Belfast (GB)

( * ) Notice: Subject to any disclaimer, the term of this patent is extended or adjusted under 35 U.S.C. 154(b) by 0 days.

(21) Appl. No.: 15/376,705

(22) Filed: Dec. 13, 2016

(51) Int. Cl.
 G06F 17/30 (2006.01)
 G06F 7/00 (2006.01)
 G06N 3/08 (2006.01)
 G06N 7/00 (2006.01)

(52) U.S. Cl.
 CPC .... G06F 17/30424 (2013.01); G06F 17/3033 (2013.01); G06F 17/30324 (2013.01); G06F 17/30327 (2013.01); G06N 3/08 (2013.01); G06N 7/005 (2013.01)

(58) Field of Classification Search
 CPC ......... G06F 17/30949; G06F 17/30067; G06F 17/30516; G06F 17/30864; G06F 17/30985
 USPC ........................................................ 707/747
 See application file for complete search history.

(56) References Cited

U.S. PATENT DOCUMENTS

| | | | |
|---|---|---|---|
| 2011/0249899 A1* | 10/2011 | Wu | G06K 9/6211 382/190 |
| 2012/0016845 A1* | 1/2012 | Bates | G06F 3/0608 707/692 |
| 2015/0088899 A1* | 3/2015 | Hoffert | G06F 17/30321 707/741 |
| 2016/0103900 A1* | 4/2016 | Angelov | G06F 17/30675 707/602 |
| 2016/0247175 A1* | 8/2016 | Milton | G06Q 30/0205 |
| 2016/0352656 A1* | 12/2016 | Galley | G06F 17/2881 |

* cited by examiner

Primary Examiner — Usmaan Saeed
Assistant Examiner — Raquel Perez-Arroyo

(57) ABSTRACT

A system and method for generating automated response to an input query received from a user in a human-machine interaction environment are described. The system may comprise an external memory wherein the data is stored and segregated into a plurality of segments in the hierarchical structure. The system may further comprise a processor and a memory coupled with the processor. The processor may execute a plurality of modules stored in the memory. A segment identification module may be configured to identify a relevant segment, from the plurality of segments, matching with a user input. A relevant data determination module may be configured to determine relevant data within the relevant segment matching with the user input. A response generation module may be configured to generate a response with respect to the user input based upon the relevant data.

11 Claims, 13 Drawing Sheets

SYSTEM AND METHOD FOR GENERATING AUTOMATED RESPONSE TO AN INPUT QUERY RECEIVED FROM A USER IN A HUMAN-MACHINE INTERACTION ENVIRONMENT

TECHNICAL FIELD

The present application described herein, in general, relates to system and method for generating automated response to an input query received from a user in a human-machine interaction environment.

BACKGROUND

Recently, technological advanced machine learning techniques have been utilized in numerous customer-centric applications. One of such application is a human-machine interaction system wherein a machine converses with a human in natural language. Typically, such human-machine interaction system has been implemented as chatbots. The chatbots implemented today are mostly built for question and answering tasks. However, it has been observed that there are issues with a proper functioning/performance of the these chatbots. For example, these chatbots often lose context of conversation and tend to ask the same questions or respond with same answers repeatedly. Further, these chatbots do not memorize conversations and the end-users well. Furthermore, some of the chatbots are built for specific domains and hence do not perform well in the other domains. This is because the underlying system controlling these chatbots fails to provide an effective and/or efficient way to access large-scale memory of the system's understanding about the world and the end-users (humans).

SUMMARY

This summary is provided to introduce concepts related to systems and methods for generating automated response to an input query received from a user in a human-machine interaction environment and the concepts are further described below in the detailed description. This summary is not intended to identify essential features of the claimed subject matter nor is it intended for use in determining or limiting the scope of the claimed subject matter.

In one implementation, a system for generating automated response to an input query received from a user in a human-machine interaction environment is disclosed. The system may comprise an external memory, wherein the external memory comprises data stored in a hierarchical structure, and wherein the data is segregated into a plurality of segments in the hierarchical structure. The system may further comprise a processor in communication with the external memory, and a memory coupled with the processor. The processor may execute a plurality of modules stored in the memory. The plurality of modules may comprise a segment identification module, a relevant data determination module and a response generation module. In one embodiment, the processor may execute the segment identification module to identify a relevant segment, from the plurality of segments, matching with a user input. The processor may further execute the relevant data determination module to determine relevant data within the relevant segment matching with the user input. Further, the processor may execute the response generation module to generate a response with respect to the user input based upon the relevant data.

In another implementation, a method for generating automated response to an input query received from a user in a human-machine interaction environment is disclosed. The method may comprise storing, via an external memory, data in the hierarchical structure, wherein the data is segregated into a plurality of segments in the hierarchical structure. The method may further comprise identifying, via a processor, the relevant segment from the plurality of segments matching with a user input. The method may further comprise determining, via the processor, relevant data within the relevant segment matching with the user input. Further, the method may comprise generating, via the processor, a response with respect to the user input based upon the relevant data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
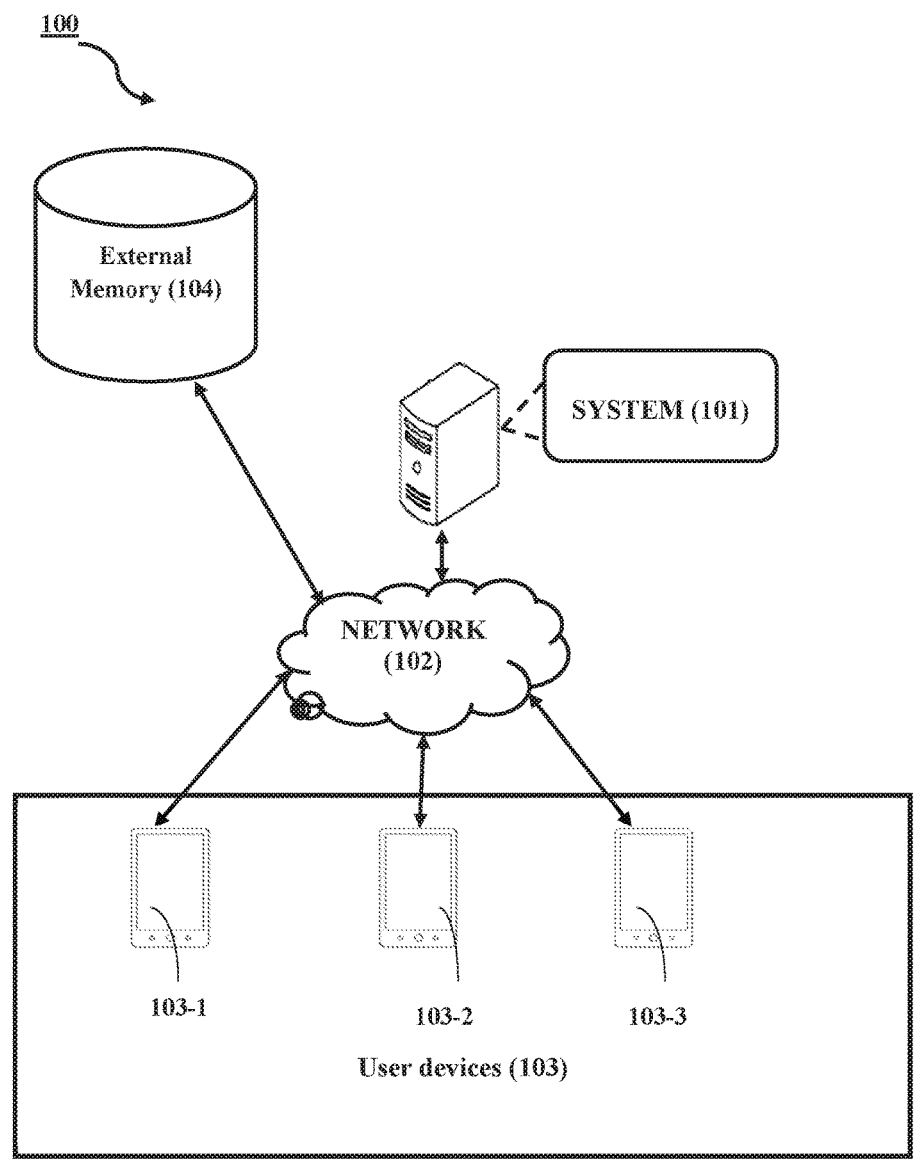
FIG. 1 illustrates a network implementation 100 of a system 101 in communication with an external memory 104 for generating automated response to an input query received from a user in a human-machine interaction environment, in accordance with an embodiment of the present application.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System(s) and method(s) for generating automated response to an input query received from a user in a human-machine interaction environment are described. The system may comprise an external memory storing data in a hierarchical structure. Further, the data stored in the hierarchical structure may be segregated into a plurality of segments. In one embodiment, the data stored in the external memory may comprise user context data and system knowledge data. In one embodiment, the data may be stored in form of a plurality of data vectors. Further, the plurality of segments may be stored in form of a plurality of segment vectors such that each segment vector comprises a subset of data vectors.

In accordance to aspects of the present application, each segment vector may be generated based on one or more hashing functions using a hashing technique. It must be understood that each hashing function may enable segregation of data vectors into multiple buckets. Further, each hashing function, each bucket and each data vector may have a hashing index, a bucket index and a data index, respectively, such that a data vector segregated into a bucket is capable of being retrieved from the external memory using a combination of the hash index, the bucket index and the data index. Furthermore, each segment vector in the external memory may have a segment index, the segment index being a concatenation of the hashing index and the bucket index In accordance with aspects of the present application, a relevant segment, from the plurality of segments, matching with a user input may be identified. The relevant segment may be identified by initially encoding the user input into a segment query vector and encoding each segment vector into a segment matching vector. In an embodiment, the user input may be encoded into the segment query vector and the segment vector may be encoded into the segment matching vector based on a machine learning technique known in the art. Further, a similarity score for each segment matching vector with respect to the segment query vector may be computed using a cosine similarity. Finally, a probability distribution over the segments in the segment matching vectors may be calculated based upon the similarity score. In an embodiment, the probability distribution over the segments may be calculated using a SoftMax function implemented in machine learning techniques. In one embodiment, the relevant segment may be selected based on the probability distribution calculated over the segments using a random sampling technique.

After the selection of the relevant segment, relevant data within the relevant segment matching with the user input may be determined. The relevant data may be determined by initially retrieving data vectors corresponding to the relevant segment. In an embodiment, the data vectors corresponding to the relevant segment may be retrieved based upon the bucket index and the hash index derived from the segment index of the relevant segment. Further, the user input may be encoded into a data query vector. In an embodiment, the user input may be encoded into the data query vector based on a machine learning technique known in the art. Thereafter, a similarity score for each entry in the data vectors with respect to the data query vector may be computed using a cosine similarity. Based upon the similarity score, a probability distribution over the data in the data vectors may be calculated. Further, each data vector may be encoded into a data output matching vector. In an embodiment, each data vector may be encoded into the data output matching vector based on a machine learning technique known in the art. Further, a weighted sum of entries in each data output matching vector may be computed based upon the probability distribution calculated over the data. In an embodiment, the probability distribution over the data may be calculated using the SoftMax function implemented in machine learning techniques. Finally, a data output vector may be obtained based upon the weighted sum of the entries in each data output matching vector. The data output vector represents the relevant data determined within the relevant segment.

Subsequent to the determination of the relevant data, a response with respect to the user input may be generated based upon the relevant data. In order to generate the response, the data output vector obtained may be decoded into a relevant output vector using the data output vector and the data query vector. In an embodiment, the data output vector may be decoded into the relevant output vector using the data output vector and the data query vector based on a machine learning technique known in the art. Further, the relevant output vector may be transformed into a probability distribution over the output predictions to predict relevant output, wherein the relevant output predicted indicates the response generated with respect to the user input. In an embodiment, the relevant output vector may be transformed into a probability distribution over the output predictions using the SoftMax function implemented in machine learning techniques.

While aspects of described system and method for generating automated response to an input query received from a user in a human-machine interaction environment may be implemented in any number of different computing systems, environments, and/or configurations, the embodiments are described in the context of the following exemplary system.

Referring to FIG. 1, a network implementation 100 of a system 101 for generating automated response to an input query received from a user in a human-machine interaction environment is illustrated, in accordance with an embodiment of the present application. The system 101 may be in communication with the external memory 104 storing data in a hierarchical structure. Although the present application is explained considering that the system 101 is implemented as a server, it may be understood that the system 101 may also be implemented in a variety of computing systems, such as a laptop computer, a desktop computer, a notebook, a handheld device, a mobile device, a workstation, a mainframe computer, a network server, and the like. In one implementation, the system 101 may be implemented in a cloud-based environment. It will be understood that the system 101 may be accessed by multiple users through one or more user devices 103-1, 103-2, 103-3 . . . 103-N, collectively also referred to as user devices 103 hereinafter, or applications residing on the user devices 103. Examples of the user devices 103 may include, but are not limited to, a portable computer, a personal digital assistant, a handheld device, a wearable device, a workstation and the like. The user devices 103 are communicatively coupled to the system 101 through a network 102.

In one implementation, the network 102 may be a wireless network, a wired network or a combination thereof. The network 102 can be implemented as one of the different types of networks, cellular communication network, local area network (LAN), wide area network (WAN), the internet, and the like. The network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 102 may include a variety of network devices, including routers, bridges, servers, computing devices, storage devices, and the like.

Figure 2:
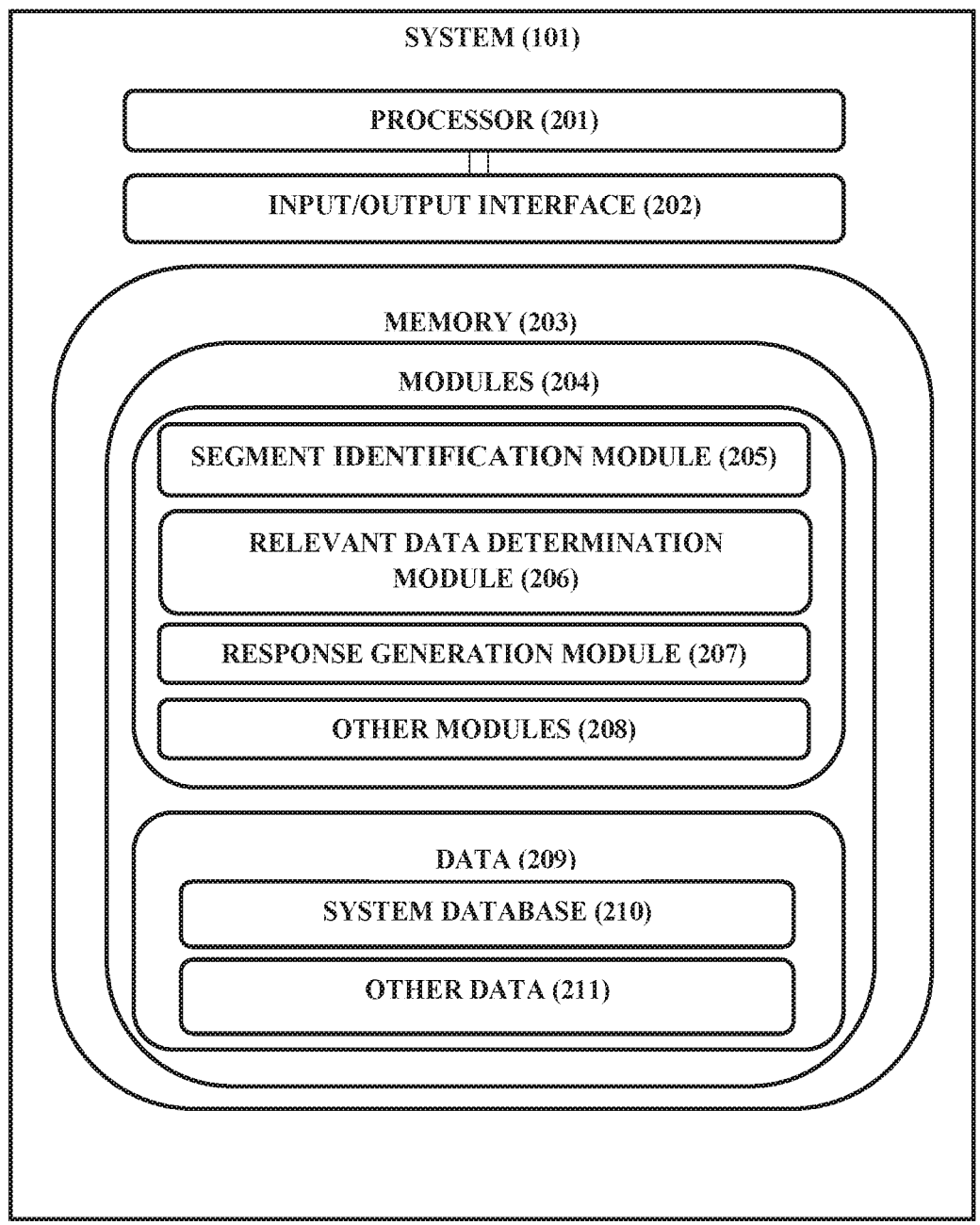
FIG. 2 illustrates components of the system 101, in accordance with an embodiment of the present application.

Referring now to FIG. 2, the system 101 is illustrated in accordance with an embodiment of the present application. In one embodiment, the system 101 may include a processor 201, an input/output (I/O) interface 202, and a memory 203. The processor 201 may be implemented as one or more microprocessors, microcomputers, microcontrollers, digital signal processors, central processing units, state machines, logic circuitries, and/or any devices that manipulate signals based on operational instructions. Among other capabilities, the processor 201 is configured to fetch and execute computer-readable/programmed instructions stored in the memory 203.

The I/O interface 202 may include a variety of software and hardware interfaces, for example, a web interface, a graphical user interface, and the like. The I/O interface 202 may allow the system 101 to interact with a user directly or through the user devices 103. Further, the I/O interface 202 may enable the system 101 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting a number of devices to one another or to another server.

The memory 203 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and memory cards. The memory 203 may include modules 204 and data 209.

In one embodiment, the modules 204 include routines, programs, objects, components, data structures, etc., which perform particular tasks, functions or implement particular abstract data types. In one implementation, the modules 204 may include a segment identification module 205, a relevant data determination module 206, a response generation module 207 and other modules 208.

The data 209, amongst other things, serves as a repository for storing data processed, received, and generated by one or more of the modules 204. The data 209 may also include a system database 210 and other data 211. The other data 211 may include data generated as a result of the execution of one or more modules in the other modules 208.

In one implementation, at first, a user may use the user device 103 to access the system 101 via the I/O interface 202. The user may register himself using the I/O interface 202 in order to use the system 101. In one embodiment, the user 103 may provide an input query to the system 101 via the I/O interface 202. In return, the system 101 may generate a response corresponding to the input query from the user 103 and provide the response to the user via the I/O interface 202. The detailed working of the system 101 for generating the response using the plurality of modules 204 is explained referring to FIGS. 3-13 as below.

Figure 3:
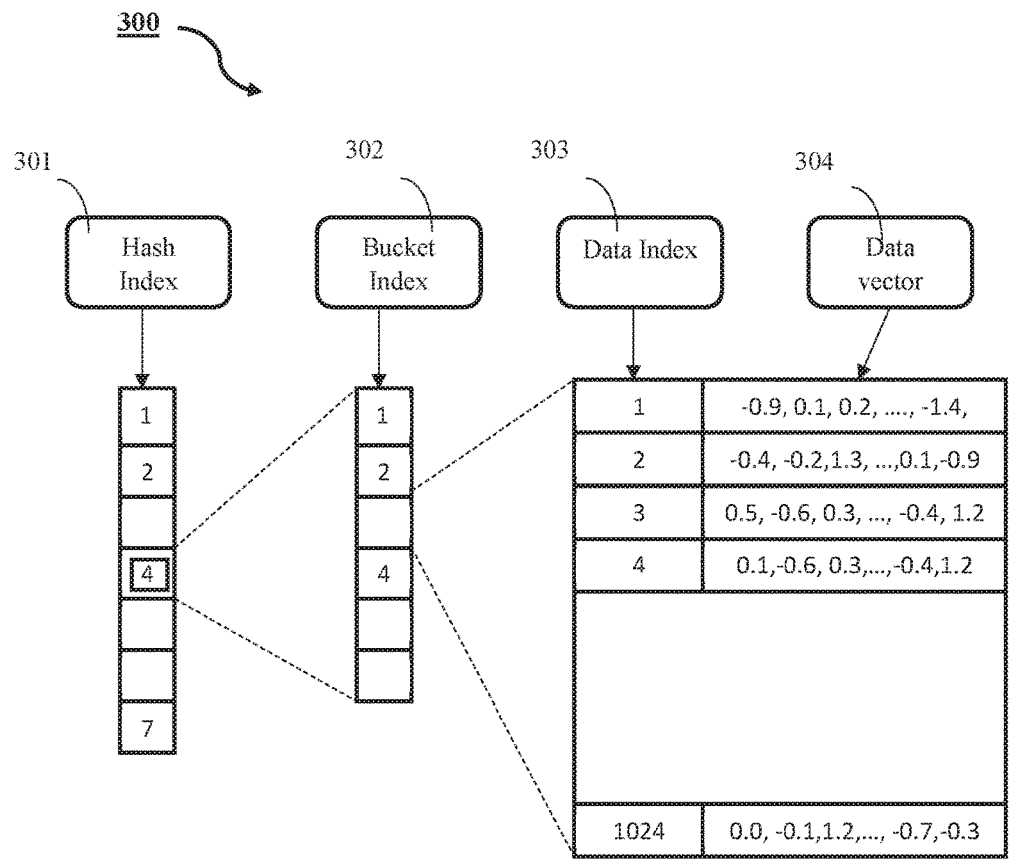
FIG. 3 illustrates a high dimensional data storage 300 which is an instance of the external memory 104 in a hierarchical structure, in accordance with an embodiment of the present application.

Now referring FIG. 3, a high dimensional data storage 300 is illustrated that represents an instance of the external memory 104 storing data in hierarchical structure. The data may be segregated into a plurality of segments within the external memory 104. The high dimensional data storage 300 is logically a contextual factor space. The contextual factor space may further comprise a system knowledge data and a user context data and corresponding information related to the system knowledge data and the user context data. It must be understood that the system knowledge and the user context refers to a contextual factor and their corresponding information (i.e. the system knowledge data and the user context data refers to the contextual factor space. It must be understood that the system knowledge data indicate the understanding of world and the user context data indicate the understanding of the user. In one embodiment, the user context data is generated based on analysis of user conversation history, user profile data and any other user related information. In an embodiment, the user context data and the system knowledge data may be stored in form of a plurality of data vectors. Further, the plurality of segments is stored in form of a plurality of segment vectors such that each segment vector comprises a subset of data vectors.

Now, referring to FIG. 3, segmentation of the data in the high dimensional data storage 300 using hashing algorithm such as locality sensitive hashing is illustrated, in accordance with an embodiment of the present application. In order to segregate the data, hashing may be carried out several times which creates multiple hash indexes. Each hash function has its own hash index 301. Specifically, for each hash function, multiple cuts/divisions may be carried out in the contextual factor space such that the data is segregated into multiple buckets. In one example, corresponding to seven hashing functions, seven hashing indexes may be created as shown in FIG. 3. Further, referring to FIG. 3, it is observed that there are 1024 data vectors in a third bucket using a forth hash function. For each bucket and each data vector, a unique bucket index 302 and a unique data index 303 may be created. It must be understood the hash index 301, the bucket index 302 and the data index 303 may enable the system 101 to locate a data vector 304 in the contextual factor space.

Figure 4:
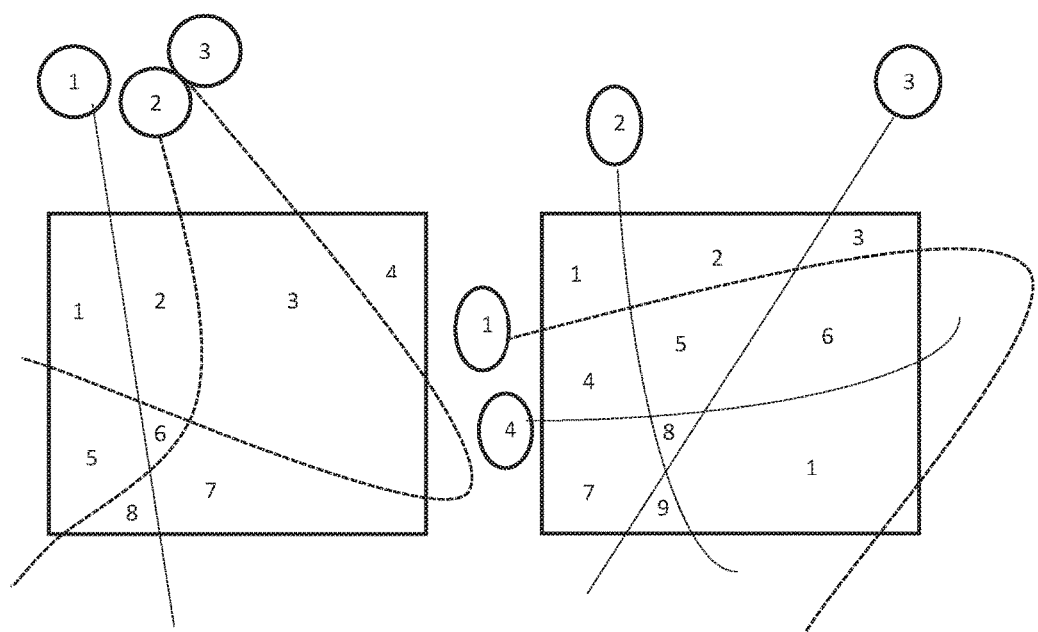
FIG. 4 illustrates a locality sensitive hashing technique using random binary projection for segmenting data stored in the external memory 104, in accordance with an embodiment of the present application.

Referring to FIG. 4 is a locality sensitive hashing technique/algorithm using random binary projection for segmenting data stored in the external memory 104, in accordance with an embodiment of the present application. As shown in FIG. 4, the square in the left and in the right belongs to the same contextual factor space wherein three cuts are carried out in the left space while four cuts are carried out in the right space. In one embodiment, different number of hash functions and different number of cuts, results into number of buckets that contains different combination of data vectors as shown in FIG. 3. In one embodiment, the system 101 may use hashing method such as random binary projection. In another embodiment, the system 101 may use principal component analysis or any other hashing algorithm.

Figure 5:
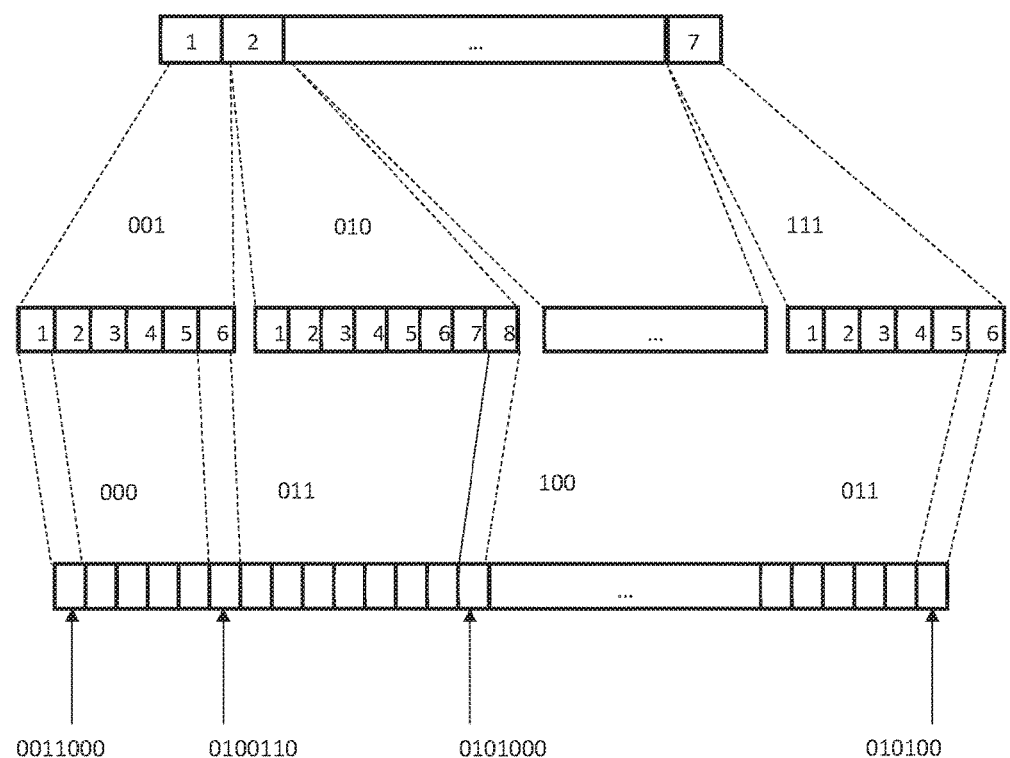
FIG. 5 illustrates a segment vector for each segment, in accordance with an embodiment of the present application.

Now referring to FIG. 5, a segment vector corresponding to each segment is illustrated, in accordance with an embodiment of the present application. In an embodiment, each segment vector has a segment index, wherein the segment index is the concatenation of the hashing index and the bucket index. In an embodiment, the hash index 301 and the bucket index 302 may be converted from decimal to binary. In one exemplary embodiment, as shown in FIG. 5, a hash index "1" is converted into "001" and a bucket index "8" is converted into "1000". In one embodiment, the number of binary digits required for a bucket depends on the largest index across all buckets. In one embodiment, each entry in the segment vector is represented by a unique identifier wherein the unique identifier is formed by the concatenation of hash index 301 and the bucket index 302. In one exemplary embodiment, the concatenation of the binary representation of the first hash index (i.e. 001) and the first bucket index (i.e. 0001) results in the binary value of "00100001". Similarly, based on the other hash indexes and the bucket indexes, the final structure of the segment vector as shown in FIG. 5 is obtained. In one embodiment, each of the segment vectors is generated by using hot encoding technique known in the art. It is to be noted that the segment vectors logically represent all segments in the contextual factor space.

Figure 6:
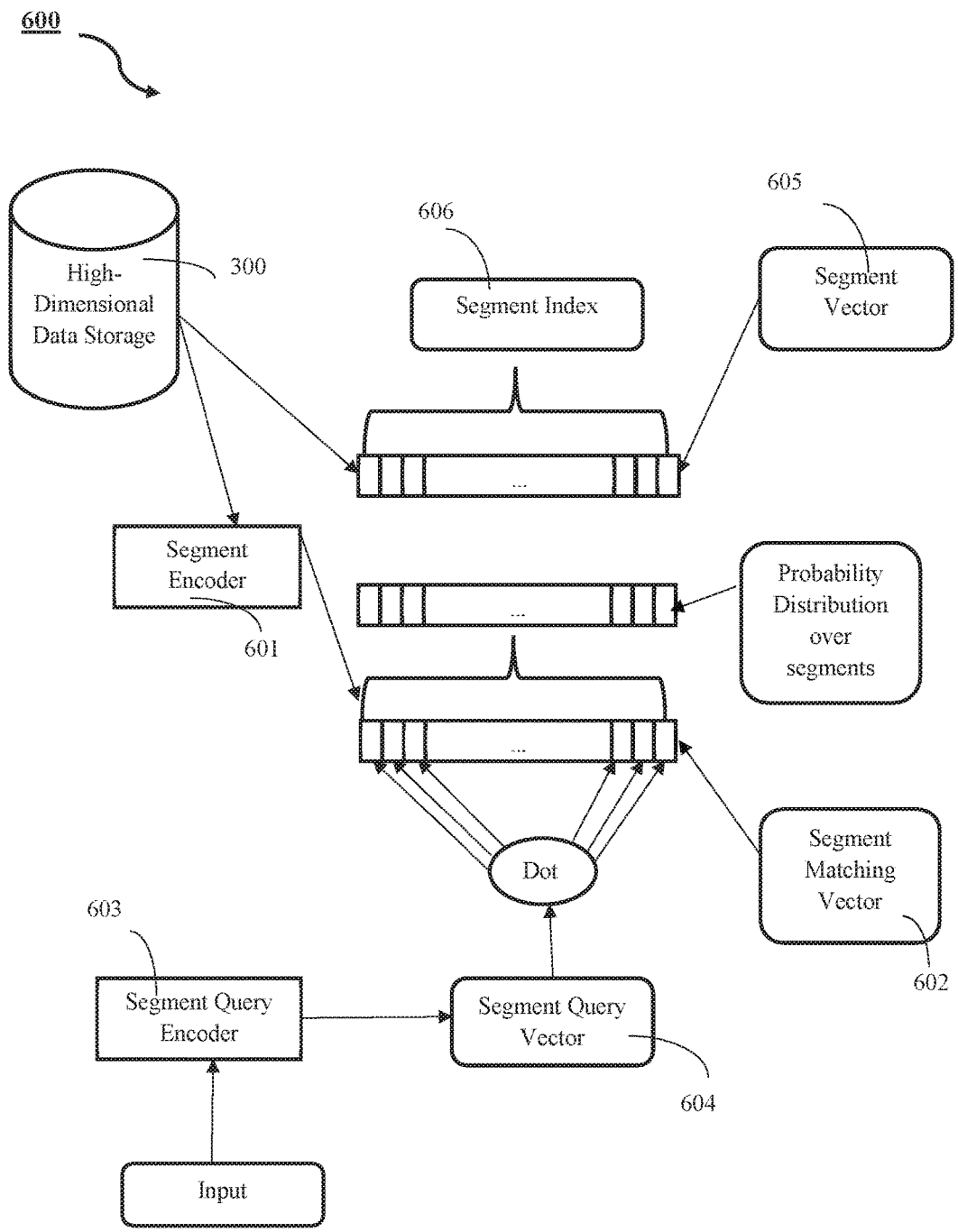
FIG. 6 illustrates a block diagram 600 depicting working of a segment identification module 205 in conjunction with the high dimensional data storage 300 and other components, in accordance with the embodiment of the present application.

Now referring FIG. 6 is a block diagram 600 depicting working of the segment identification module 205 in conjunction with the high dimensional data storage 300 and other components, in accordance with the embodiment of the present application. The segment identification module 205 may receive a user input from the I/O interface 202. In one embodiment, the user input may be in any format including, but not limited to, text, image, audio, video, any other conversation context, and the like. The segment identification module 205 may convert the user input into an input sequence by selecting proper input features. Specifically, the system 101 may receive a text input and construct a text input sequence of bigrams, thought vectors or other distributed representation learning method. In one example, the input sequence may be a sequence of characters, a sequence of word vector, a sequence of image pixels or a sequence of digital audio signal. It is to be noted that such feature selection and sequence conversion is not the focus of the present application and hence such methods are not explained/covered in details.

The input sequence may be encoded into segment query vector 604. In one embodiment, the segment query encoder 603 may encode the input sequence into the segment query vector 604. In an embodiment, the segment query encoder 603 may be pre-trained using machine learning methodologies known in the art to encode the input sequence into the segment query vector 604. In one embodiment, the segment query encoder 603 may be a mathematical function trained by a machine learning technique such as an Artificial Neural Network (ANN). In one embodiment, the segment query encoder 603 may act an embedding layer within the machine-learned Artificial Neural Network. In one embodiment, the segment query encoder 603 may convert input sequence into a format understandable by the embedding layer. The segment identification module 205 may obtain a segment vector 605 from the high dimensional data storage 300 based on the methodology described above in reference with FIG. 5. Further, the segment encoder 601 may encode the segment vector 605 into segment matching vector 602. In an embodiment, the segment encoder 601 may be pre-trained using machine learning methodologies known in the art to encode the segment vector 605 into the segment matching vector 602. In one embodiment, the segment encoder 601 may be a mathematical function trained by a machine learning technique such as Artificial Neural Network (ANN). In one embodiment, the segment encoder 601 may act as an embedding layer within the machine-learned Artificial Neural Network. In one embodiment, the segment encoder 601 may convert the segment vector 605 into a format understandable by the embedding layer. The segment identification module 205 may compute a similarity score for each entry in the segment matching vector 602 with respect to the segment query vector 604 based on cosine similarity. Further, the segment identification module 205 may compute a probability distribution over segments in the segment query vector 604 using a SoftMax function.

It is to be noted that the SoftMax function (or a normalized exponential function) is a final layer in machine-learned neural networks used for classification. Such networks are then trained under a log loss (or cross-entropy) regime, giving a non-linear variant of multinomial logistic regression. Further, it must be noted to one skilled in the art that in the machine learning methods/techniques, the SoftMax function may be configured to map a vector to a probability of a given output in binary classification. The SoftMax function may receive an input vector and generate an output vector with real values between 0 and 1.

Based upon the probability over segments, the segment identification module 205 may select a segment index 606 from the segment vector 605. In one embodiment, the segment index 606 may be selected via a random sampling technique known in the art. It must be understood that the task/functionality of the segment identification module 205 is to learn a function for the segment encoder 601 and that for the segment query encoder 603 such that a relevant segment with respect to the user input and the external memory may be identified based on the similarity measures between the segment query vector 604 and the segment matching vector 602. Specifically, using the machine learned ANN technique, the segment query encoder 603 and the segment encoder 601 may be jointly trained to learn appropriate mathematical functions to convert the input sequence into the segment query vector and the segment vector into the segment matching vector, respectively, such that the segment query vector and the segment matching vector are matched based on similarity of latent factors of both the vectors thereby enabling the identification of the relevant segment. After the identification of the relevant segment index, the system 101 may determine relevant data within the segment corresponding to the segment index using the relevant data determination module 206, the details of which are explained hereinafter.

Figure 7:
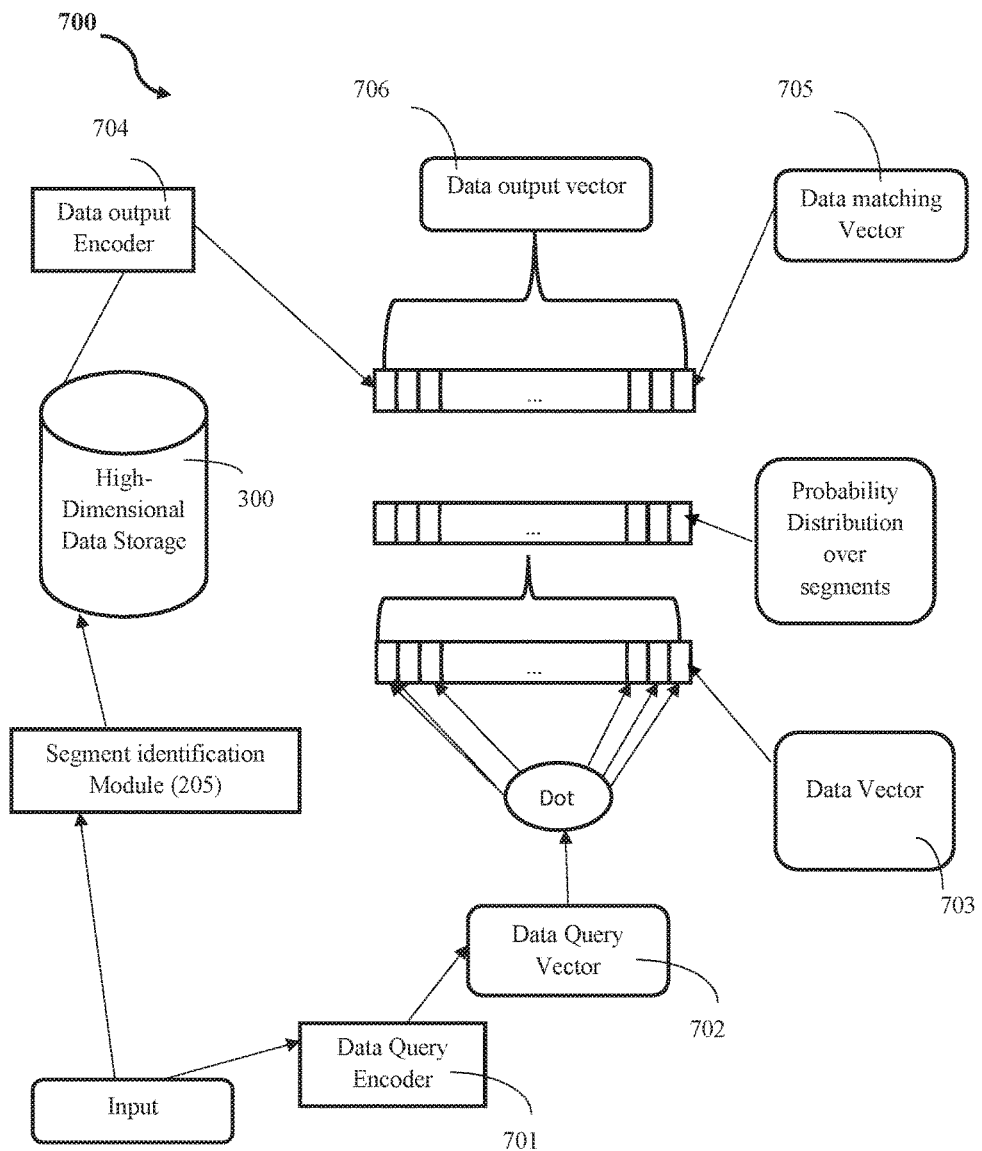
FIG. 7 illustrates a block diagram 700 depicting working of a relevant data determination module 206 in conjunction with the high dimensional data storage 300 and other components, in accordance with an embodiment of the present application.

Referring to FIG. 7 is a block diagram 700 depicting working of the relevant data determination module 206 in conjunction with the high dimensional data storage 300 and other components, in accordance with an embodiment of the present application. The relevant data determination module 206 may be configured to determine the relevant piece of information in the relevant segment of the external memory 104 with respect to user input. In order to determine the relevant data, the relevant data determination module 206 may retrieve data vectors 703 from the external memory using the combination of the hash index and the bucket index based upon the segment index identified by the the segment identification module 205.

Referring FIG. 7, a data query encoder 701 may encode the user input into a data query vector 702. In an embodiment, the data query encoder 701 may be pre-trained using machine learning methodologies known in the art to encode the user input into the data query vector 702. In one embodiment, the data query encoder 701 may be a mathematical function trained by a machine learning technique such as an Artificial Neural Network (ANN). In one embodiment, the data query encoder 701 may act as an embedding layer within the machine-learned Artificial neural network (ANN). In one embodiment, the data query encoder may convert input sequence into a format understandable by the embedding layer. Further, the relevant data determination module 206 may compute a similarity score of each entry in data vector 703 with respect to the data query vector 702 using a cosine similarity. Further, the relevant data determination module 206 may compute a probability distribution over data in the data vectors 703 using the SoftMax function based on the cosine similarity computed for each entry in the data vector. It must be understood that the probability distribution over data in the data vectors may logically represent a degree of relevance of each entry in the data vectors 703 with respect to the user input. The data output encoder 704 may encode a copy of data vector 703 into the data output matching vector 705. In an embodiment, the data output encoder 704 may be pre-trained using machine learning methodologies known in the art to encode copy of data vector 703 into the data output matching vector 705. In one embodiment, the data output encoder 704 may be a mathematical function trained by the machine learning technique such as an Artificial Neural Network (ANN). In one embodiment, the data output encoder 704 may act as an embedding layer within the machine-learned Artificial neural network. In one embodiment, the data output encoder may convert the data vector 703 into a format understandable by the embedding layer. Further, the relevant data determination module 206 may compute a weighted sum of all entries in data output matching vector 705 based on the probability distribution over data in order to obtain data output vector 706. In one embodiment, the data output matching vector 705 may contain latent factors for decoding output using the response generation module 207 explained later in subsequent paragraphs. It must be understood that the task/functionality of the relevant data determination module 206 is to learn a function for the data query encoder 701 and that for the data output encoder 704 such that relevant information in a relevant segment with respect to user input and external memory may be determined based on the similarity measures between the data query vector 702 and the data vector 703. Specifically, using the machine learned ANN technique, the data query encoder 701 and the data output encoder 704 may be jointly trained to learn appropriate mathematical functions to convert the input sequence into the data query vector 702 and the data vector 703 into the data output matching vector 705, respectively, such that the data query vector 702 and the data vector 703 are matched based on similarity of latent factors of both the vectors. Further, the relevant data determination module 206 may generate a relevant output vector from the relevant information.

After the determination of the relevant data and the relevant output vector, the system 101 may generate an output based on the relevant information retrieved from the contextual factor space with respect to the user input using the response generation module 207, the details of which are explained hereinafter.

Figure 8:
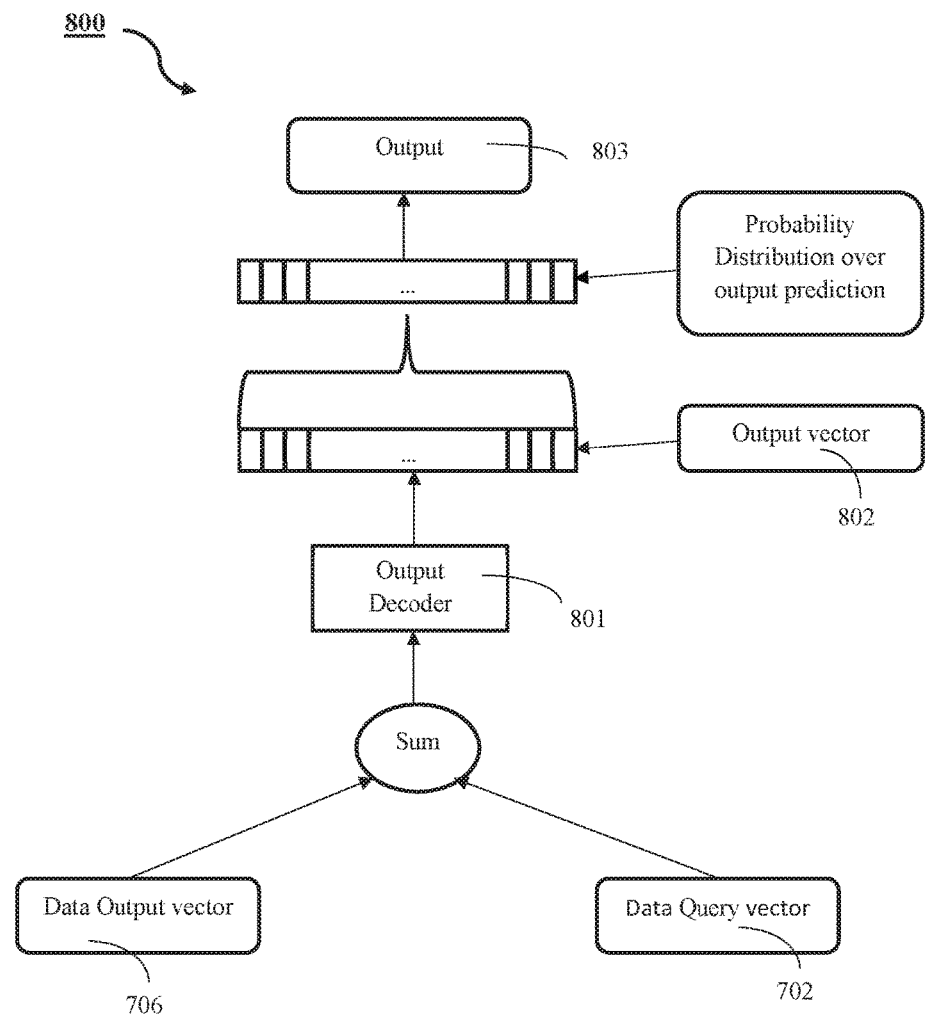
FIG. 8 illustrates a block diagram 800 depicting working of a response generation module 207 conjunction with the high dimensional data storage 300 and other components, in accordance with an embodiment of the present application.

Referring to FIG. 8 is a block diagram 800 depicting working of the response generation module 207 in conjunction with the high dimensional data storage 300 and other components, in accordance with an embodiment of the present application. In an embodiment, the response generation module 208 may generate output 803 based on the relevant information retrieved from the contextual space factor and the encoded user input. As shown in FIG. 8, the output decoder 801 may use the data output vector 706 and the data query vector 702 to generate relevant output vector 802. In an embodiment, the data output decoder 801 may be pre-trained using machine learning methodologies known in the art to generate the relevant output vector 802 using the data output vector 706 and the data query vector 702. In one embodiment, the output decoder 801 may be a mathematical function trained by a machine learning technique such as an Artificial Neural Network (ANN). In one embodiment, the output decoder 801 may be a recurrent layer within the machine-learned Artificial neural network, wherein the recurrent layer may be configured to convert the output vector 802 into an output sequence. It must be understood that the data output encoder 801 (acting as the recurrent layer) may be trained to learn an appropriate mathematical function to predict output over time steps based on latent factors of both the data output vector 706 and the data query vector 702. In one embodiment, the recurrent layer may predict the output using SoftMax function over time steps. In one embodiment, the number of time steps depends upon total length of the input vector.

In one embodiment, the relevant output vector 802 may be transformed into a probability distribution over output predictions using the SoftMax function to predict a relevant output 803. It must be understood that the task/functionality of the response generation module 207 is to learn function for the output decoder 801 such that the response generation module 207 may predict relevant output vector 802 and thereby the relevant output 803 with respect to the user input and the external memory. The relevant output 803 herein indicates the response generated by the system 101 for the user input received from the user 103 via the I/O interface 202. The relevant output may be in form of any format including, but not limited to, text, image, audio, video, any other conversation context, and the like. In one embodiment, the relevant output may be in form of output sequence which may be a sequence of characters, a sequence of word vector, a sequence of image pixels or a sequence of digital audio signal, and the like. The output sequence may then be converted into actual output. Such conversion is not within the scope of the present application and hence not explained in details.

Figure 9:
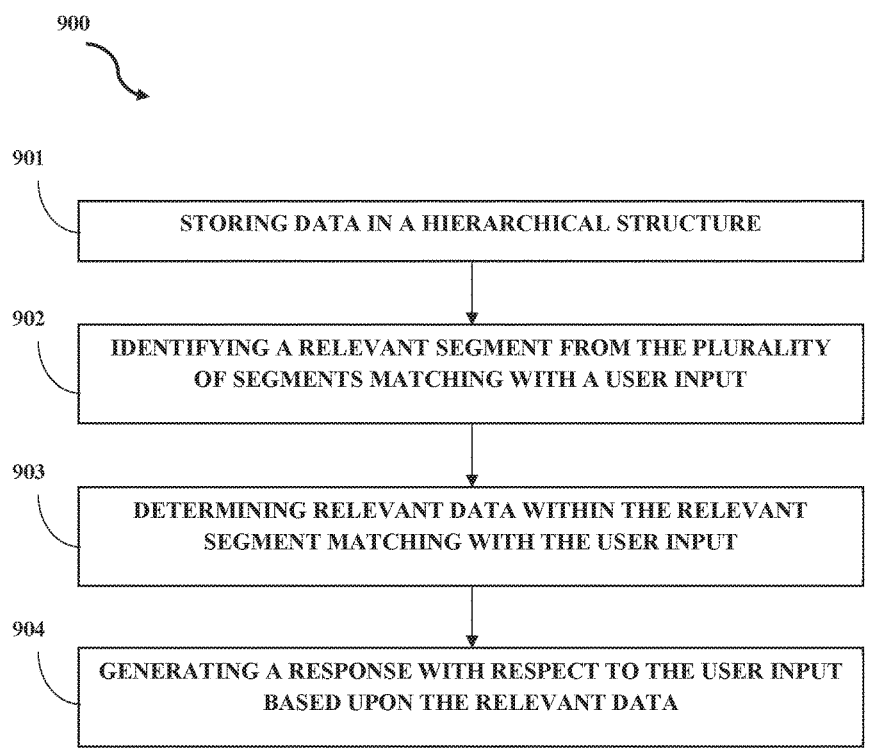
FIG. 9 illustrates a method 900 for generating automated response to an input query received from a user in a human-machine interaction environment, in accordance with an embodiment of the present application.

Now referring to FIG. 9 is a method 900 for generating automated response to an input query received from a user in a human-machine interaction environment, in accordance with an embodiment of the present application.

As shown in FIG. 9, at block 901, data may be stored as data vectors in hierarchical structure of the external memory 104. In one embodiment, the data may be segregated into a plurality of segments in the hierarchical structure. Further, the plurality of segments may be stored in form of a plurality of segment vectors such that each segment vector comprises a subset of data vectors.

At block 902, a relevant segment from the plurality of segments matching with a user input may be identified. In one implementation, the relevant segment may be identified using the segment identification module 205.

At block 903, relevant data within the relevant segment matching with respect to the user input may be determined. In one implementation, the relevant data within the relevant segment may be determined using the relevant data determination module 206.

At block 904, a response with respect to the user input may be generated based on the relevant data. In one implementation, the response may be generated using the response generation module 207.

Figure 10:
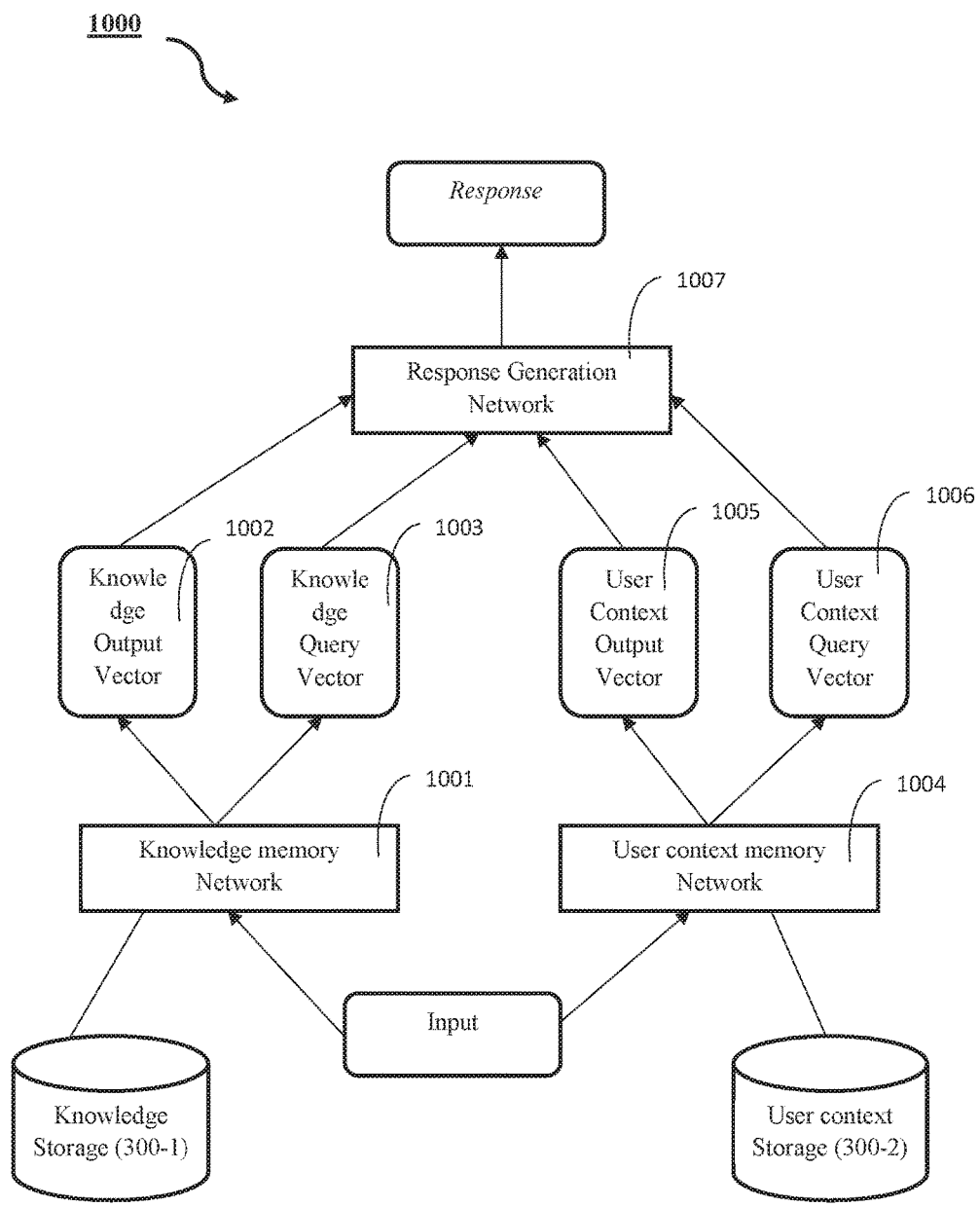
FIG. 10 illustrates an exemplary embodiment of the system 101 depicting an example of an automated response generated corresponding to an input query received from a user in a human-machine interaction environment.

Referring to FIG. 10 is an exemplary embodiment 1000 of the system 101 depicting an example of an automated response generated corresponding to an input query received from a user in a human-machine interaction environment. In this embodiment, the system 101 generates a response based on two contextual factors: system knowledge and user context. In the exemplary embodiment, the system comprises a knowledge memory network 1001 and a user context memory network 1004 as analogous to the relevant data determination module 206. The corresponding external memories for the knowledge memory network 1001 and the user context memory network 1004 may include a knowledge storage (300-1) and a user context storage (300-2) as an instance of the external memory 104. In various embodiments, the system 101 may support multiple contextual factors and multiple relevant data determination modules as well as multiple external memories. In one embodiment, the knowledge memory network 1001 may generate a knowledge output vector 1002 and a knowledge query vector 1003. Further, the user context memory network 1004 may generate a user context output vector 1005 and a user context query vector 1006. It must be understood that the knowledge output vector 1002 and the user context output vector 1005 are analogous to the data output vector 706 as shown in FIG. 7. Similarly, the knowledge query vector 1003 and the user context query vector 1006 are analogous to the data query vector 702 as shown in FIG. 7. In this exemplary embodiment, a response generation network 1007 as shown may generate a response (i.e. relevant output vector and the relevant output) with respect to the user input based on all vectors (i.e. knowledge output vector 1002, the user context output vector 1005, the knowledge query vector 1003 and the user context query vector 1006) as input vectors. It must be understood that the working of the response generation network 1007 is analogous to the working of the response generation module 207 as explained in FIG. 8. In this embodiment, the system 101 is configured to perform set of functions involved in the response generation network 1007, the knowledge memory network 1001 and the user context memory network 1004 such that the system 101 determines the relevant information of different contextual factors and generates a response based on the user input. The system 101 is further configured to match user input, information in the external memory 104 and system response and attempts to discover hidden reasoning in between the user input and the external memory 104 and in between the system response and the external memory 104.

Figure 11:
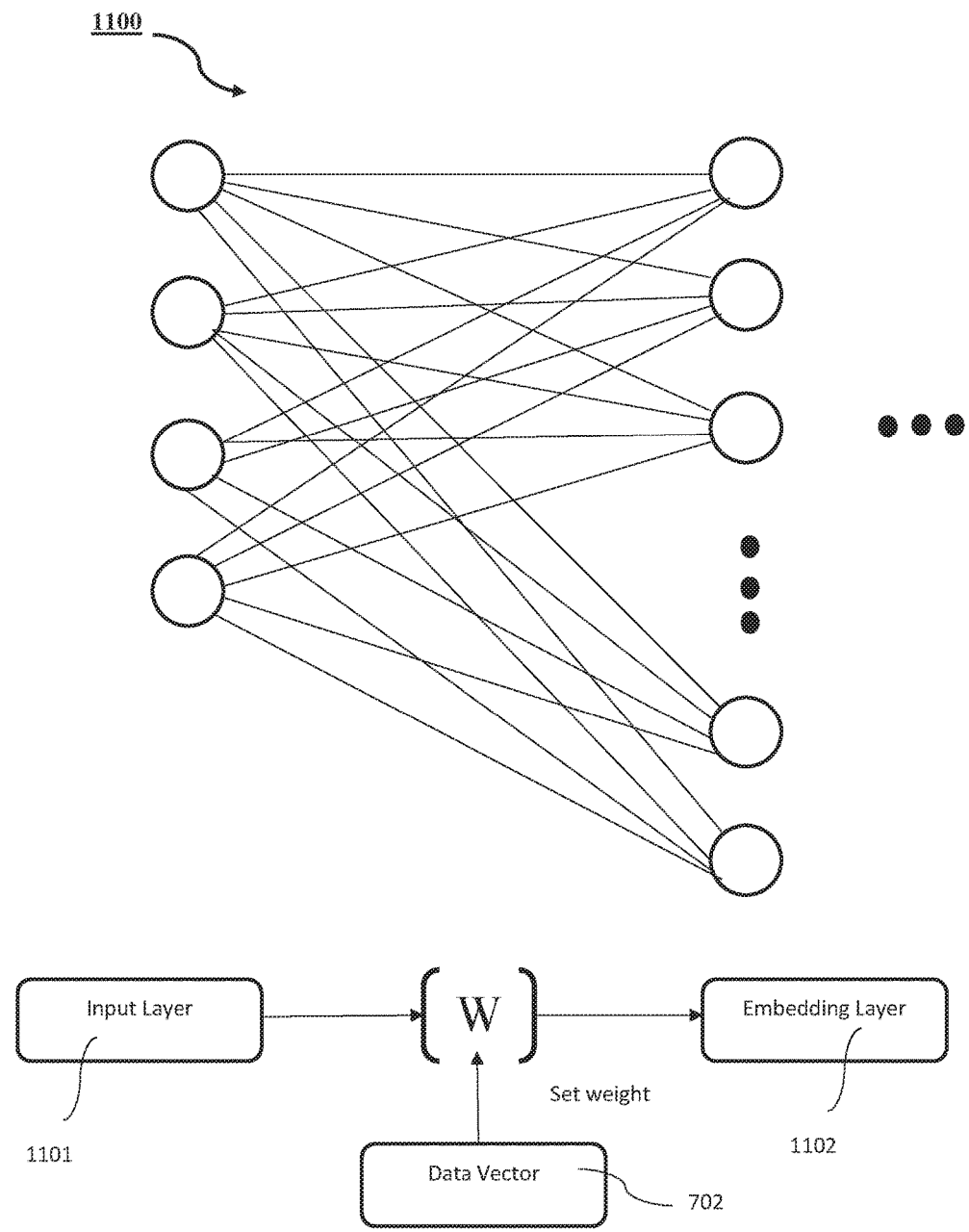
FIG. 11 illustrates a neural network 1100 implementing generation of automated response to an input query received from a user, in accordance with an embodiment of the present application.

It must be understood that the learning capabilities of the relevant segment identification module 205, the relevant data determination module 206 and the response generation module 207 to identify the relevant segment, determine the relevant data and to generate the response with respect to the user input and the external memory is by way of machine learning techniques/methodologies known in the art, such as Artificial Neural Network (ANN). FIG. 11 illustrates a neural network 1100 implementing generation of automated response to an input query received from a user, in accordance with an embodiment of the present application. As shown, the neural network 1100 comprises an input layer 1101, an embedding layer 1102 with weight matrix W. In one embodiment, the input layer 1101 may be the output layer of the data query encoder 701 and may be directly connected to the embedding layer 1102. Further, the neural network 1100 may enable configuration or setting of weights in the weight matrix W of the embedding layer 1102 in order to load data vector 703 from the high dimensional data storage 300.

Figure 12:
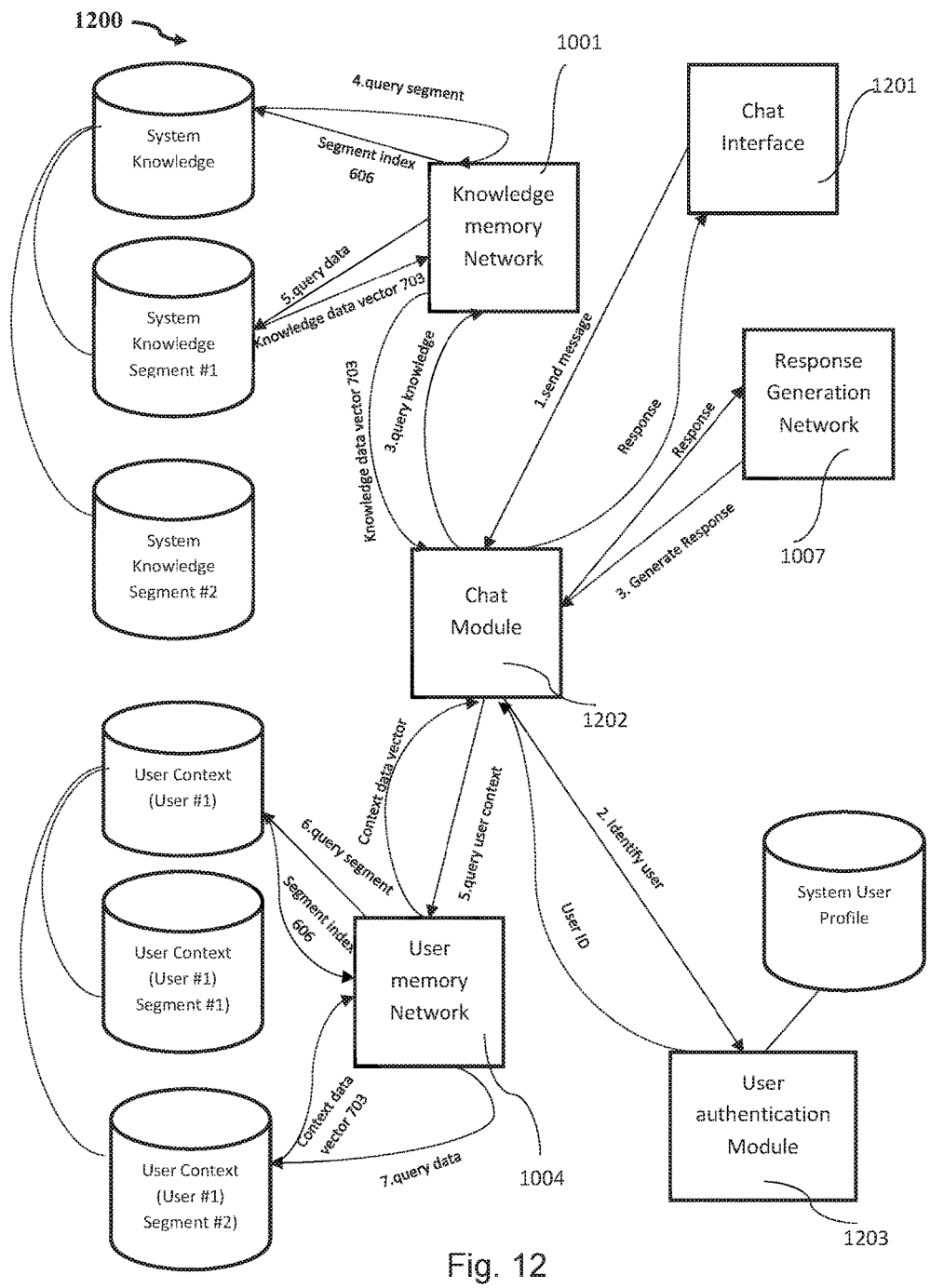
FIG. 12 illustrates an exemplary implementation 1200 of the system 101 for generating automated response to an input query received from a user in a human-machine interaction environment, in accordance with the present subject matter.

FIG. 12 illustrates an exemplary implementation 1200 of the system 101 (acting as a chat module 1202) for generating automated response to an input query received from a user in a human-machine interaction environment, in accordance with the present subject matter. In this exemplary implementation 1200, the chat module 1202 may generate a response based on two contextual factors system knowledge and user context. The system knowledge and the user context of users may be segmented using hashing algorithm as described in FIG. 4. For simplicity, each of system knowledge and the user context has only two segments, wherein the user context is of a single user. As shown in FIG. 12, the user 103 may communicate with the chat module 1202 via the I/O interface 202 acting as a chat interface 1201 as shown in FIG. 12. The chat interface 1201 may enable the user to input text, image, audio, video or any other conversation context. In this exemplary embodiment, the chat module 1202 may receive the user input and communicate with different system components to generate a system response. In this exemplary embodiment, the chat module 1202 may send the user input to the knowledge memory network 1001. The working of the knowledge memory network 1001 is analogous to the working of the relevant data determination module 206 as explained in the FIG. 7. In this exemplary embodiment, the knowledge memory network 1001 may load the segment vector 605 from the system knowledge and may determine the segment index 606 according to the user input as described in FIG. 6. In this exemplary embodiment, the target segment is identified as segment #1 in the system knowledge. In this exemplary embodiment, the knowledge memory network 1001 may encode the user input into the data query vector 702 and then query the data vector 703 from the segmented system knowledge with the target segment index 606 and the data query vector 702 as described in FIG. 7 and FIG. 9. In one exemplary embodiment, the knowledge memory network 1001 may load the data vector 703 from the segment #1 of the system knowledge and returns the knowledge output vector and the knowledge query vector to the chat module 1202.

In this exemplary embodiment, the chat module 1202 may send the user input and the user ID to user context memory network 1004 and asks for the user context data of the user. The user context memory network 1004 may load the segment vector 605 from the user context of the target user and determine the segment index 606 according to the user input as described in FIG. 6. In this case, the target segment is identified as Segment #2 in the user context of the user. The user context memory network 1004 may encode the data query vector 702 from the user input and then query the data vector 703 from the segmented user context of the user with the target segment index 606 and the data query vector 702 as described in FIG. 7 and FIG. 9. In this exemplary embodiment, the user context memory network 1004 may load the data vector 703 from the segment #2 of the user context of the user and returns the user context output vector and the user context query vector to the chat module 1202. In this exemplary embodiment, the chat module 1202 may send the knowledge data output vector and the user context data output vector as well as the corresponding data query vectors to the response generation network 1007. It must be noted that the working of the response generation network 1007 is analogous to working of the response generation module 207 as explained in FIG. 8. The response generation network 1007 may generate a system response from all the received vectors as described in FIG. 8. The response generation network 1007 then returns the system response to the chat module 1202. Further, the chat module 1202 returns the system response to the chat Interface 1201 to be visible/audible to the user 103.

Figure 13:
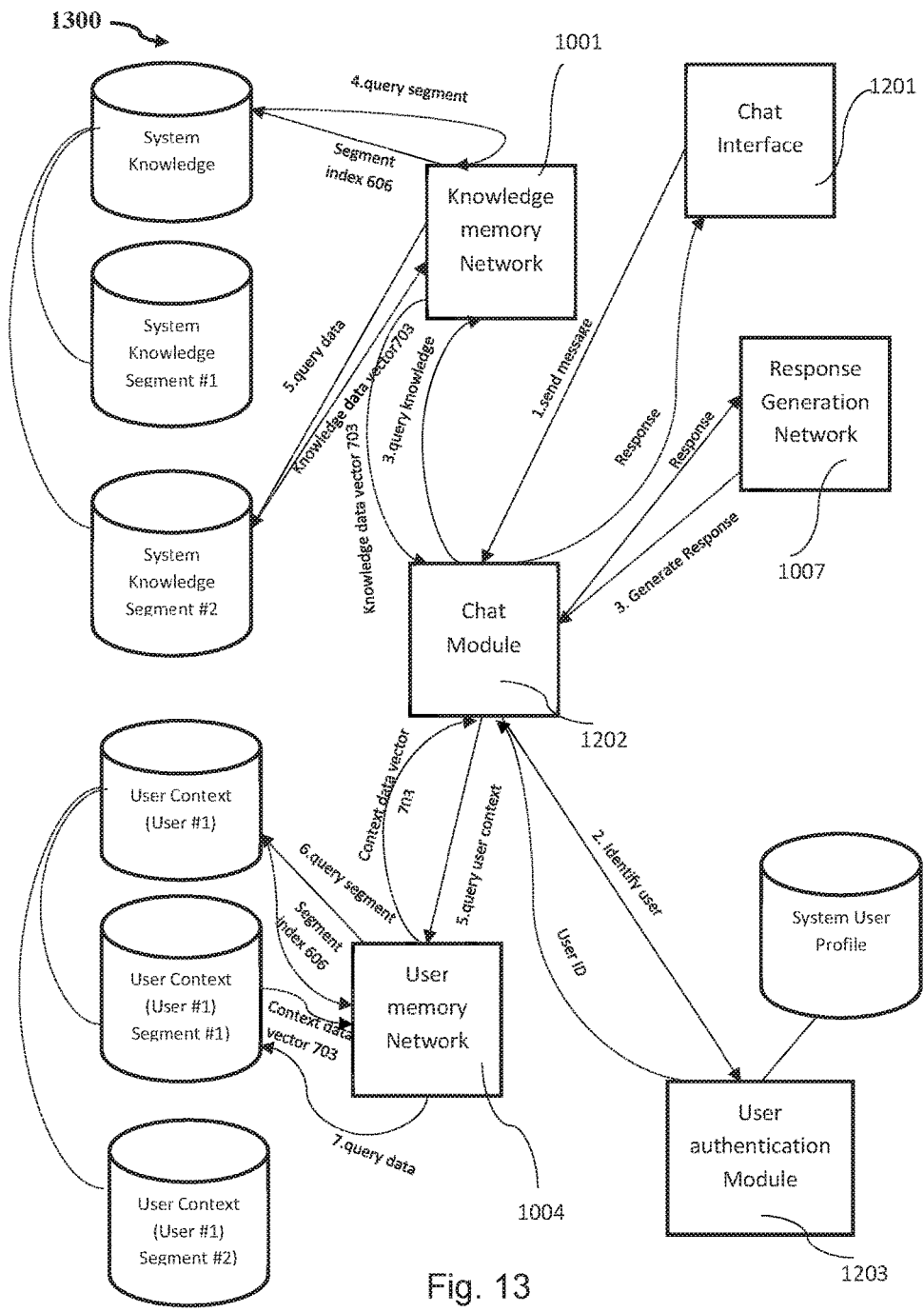
FIG. 13 illustrates an exemplary implementation 1300 of the system 101 for generating automated response to an input query received from a user in a human-machine interaction environment, in accordance with the present subject matter.

Referring to FIG. 13 is another exemplary implementation 1300 of the system 101 for generating automated response to an input query received from a user in a human-machine interaction environment, in accordance with the present subject matter. It must be noted to one skilled in the art that the sequence of flows shown in FIG. 13 is same as in FIG. 12 except the knowledge memory network 1001 determines to load data vector from Segment #2 of the system knowledge and the user context memory network 1004 determines to load the data vector from Segment #1 of the user context of the user.

Exemplary embodiments discussed above may provide certain advantages. Though not required to practice aspects of the application, these advantages may include those provided by the following features.

Some embodiments of the present application enable system and method for providing a computerized response to an input received from a user based on the real-world data and the contextual information associated with the user, wherein the contextual information is captured based upon the user's conversation history and the user's profile.

Some embodiments of the present application enable system and method configured to generate the computerized response using machine learning methods such as Artificial Neural Network (ANN).

Although implementations for systems and methods for generating automated response to an input query received from a user in a human-machine interaction environment have been described in language specific to structural features and/or methods, it is to be understood that the appended claims are not necessarily limited to the specific features or methods described. Rather, the specific features and methods are disclosed as examples of implementations for generating automated response to an input query received from a user in a human-machine interaction environment.

What is claimed is:

1. A system for generating automated response to an input query received from a user in a human-machine interaction environment, the system comprising:
   an external memory, wherein the external memory comprises data stored in a hierarchical structure, and wherein the data is segregated into a plurality of segments in the hierarchical structure;
   a processor in communication with the external memory; and
   a memory coupled with the processor, wherein the memory comprises a plurality of modules capable of being executed by the processor, the plurality of modules comprising:
      a segment identification module configured to identify a relevant segment, from the plurality of segments, matching with a user input;
      a relevant data determination module configured to determine relevant data within the relevant segment matching with the user input; and
      a response generation module configured to generate a response with respect to the user input based upon the relevant data;
      wherein the data comprises user context data and system knowledge data, wherein the user context data is generated based upon a user conversation history, a user profile and any other user-related information;
      wherein the data is stored in form of a plurality of data vectors, and wherein the plurality of segments is stored in form of a plurality of segment vectors such that each segment vector comprises a subset of data vectors;
      wherein each segment vector is generated based on one or more hashing functions via hashing technique, wherein each hashing function enables segregation of data vectors into multiple buckets, and wherein each hashing function, each bucket and each data vector has a hashing index, a bucket index and a data index, respectively, such that a data vector segregated into a bucket is capable of being retrieved from the external memory using a combination of the hash index, the bucket index and the data index, and wherein each segment vector has a segment index, the segment index being a concatenation of the hashing index and the bucket index;
      wherein the segment identification module identifies the relevant segment by
   encoding the user input into a segment query vector;
   encoding each segment vector into a segment matching vector;
   computing a similarity score for each segment matching vector with respect to the segment query vector using a cosine similarity; and
   calculating a probability distribution over the segments in the segment matching vectors based upon the similarity score thereby selecting the relevant segment, wherein the relevant segment is selected based upon random sampling technique;
      wherein the relevant data determination module determines the relevant data within the relevant segment by
   retrieving data vectors corresponding to the relevant segment;
   encoding the user input into a data query vector;
   computing a similarity score for each entry in the data vectors with respect to the data query vector using a cosine similarity;
   calculating a probability distribution over the data in the data vectors based upon the similarity score;
   encoding each data vector into a data output matching vector;
   computing a weighted sum of entries in each data output matching vector based upon the probability distribution calculated over the data; and
   obtaining a data output vector based upon the weighted sum of the entries in each data output matching vector.

2. The system of claim 1, wherein the encoding of the user input into a segment query vector and the encoding of the segment vector into a segment matching vector is based on a machine-learned Artificial Neural Network (ANN) technique, and wherein the probability distribution over the segments is calculated using a SoftMax function implemented in machine learning techniques.

3. The system of claim 1, wherein the data vectors corresponding to the relevant segment are retrieved based upon the bucket index and the hash index derived from the segment index of the relevant segment.

4. The system of claim 1, wherein the encoding of the user input into a data query vector and encoding each data vector into a data output matching vector is based on a machine-learned Artificial Neural Network (ANN) technique, and wherein the probability distribution over the data is calculated using the SoftMax function implemented in machine learning techniques.

5. The system of claim 1, wherein the response generation module generates the response based on the relevant data by
  decoding the data output vector into a relevant output vector using the data output vector and the data query vector; and
  transforming the relevant output vector into a probability distribution over output predictions to predict relevant output indicating the response generated with respect to the user input.

6. The system of claim 5, wherein the decoding the data output vector into a relevant output vector using the data output vector and the data query vector is based on a machine-learned Artificial Neural Network (ANN) technique, and wherein the relevant output vector is transformed into a probability distribution over the output predictions using the SoftMax function implemented in machine learning techniques.

7. A method for generating automated response to an input query received from a user in a human-machine interaction environment, the method comprising:
  storing, via an external memory, data in a hierarchical structure, wherein the data is segregated into a plurality of segments in the hierarchical structure;
  identifying, via a processor, a relevant segment from the plurality of segments matching with a user input;
  determining, via the processor, relevant data within the relevant segment matching with the user input; and
  generating, via the processor, a response with respect to the user input based upon the relevant data;
    wherein the data comprises user context data and system knowledge data, wherein the user context data is generated based upon a user conversation history, a user profile and any other user-related information, and wherein the data is stored in form of a plurality of data vectors, and wherein the plurality of segments is stored in form of a plurality of segment vectors such that each segment vector comprises a subset of data vectors;
    wherein the method further comprises generating each segment vector based one or more hashing functions via a hashing technique, wherein each hashing function enables segregation data vectors into multiple buckets, and wherein each hashing function, each bucket and each data vector has a hashing index, a bucket index and a data index, respectively, such that a data vector segregated into a bucket is capable of being retrieved from the external memory using a combination of the hash index, the bucket index and the data index, and wherein each segment vector has a segment index, the segment index being a concatenation of the hashing index and the bucket index;
    wherein the identifying a relevant segment comprises
      encoding, via the processor, the user input into a segment query vector;
      encoding, via the processor, each segment vector into a segment matching vector;
      computing, via the processor, a similarity score for each segment matching vector with respect to the segment query vector using a cosine similarity; and
      calculating, via the processor, a probability distribution over the segments in the segment matching vectors based upon the similarity score thereby selecting the relevant segment, wherein the relevant segment is selected based upon random sampling technique;
    wherein the determining the relevant data further comprises
      retrieving, via the processor, data vectors corresponding to the relevant segment;
      encoding, via the processor, the user input into a data query vector;
      computing, via the processor, a similarity score for each entry in the data vectors with respect to the data query vector using a cosine similarity;
      calculating, via the processor, a probability distribution over the data in the data vectors based upon the similarity score;
      encoding, via the processor, each data vector into a data output matching vector;
      computing, via the processor, a weighted sum of entries in each data output matching vector based upon the probability distribution calculated over the data; and
      obtaining, via the processor, a data output vector based upon the weighted sum of the entries in each data output matching vector.

8. The method of claim 7, wherein the encoding of the user input into a segment query vector and the encoding of the segment vector into a segment matching vector is based on a machine learning technique, and wherein the probability distribution over the segments is calculated using a SoftMax function implemented in machine learning techniques.

9. The method of claim 7, wherein the encoding of the user input into a data query vector and encoding each data vector into a data output matching vector is based on a machine learning technique, and wherein the probability distribution over the data is calculated using the SoftMax function implemented in machine learning techniques.

10. The method of claim 7, wherein the generating the response comprises
  decoding, via the processor, the data output vector into a relevant output vector based upon the data output vector and the data query vector; and
  transforming, via the processor, the relevant output vector into a probability distribution over output predictions to predict relevant output indicating the response generated with respect to the user input.

11. The method of claim 10, wherein the decoding the data output vector into a relevant output vector using the data output vector and the data query vector is based on a machine learning technique, and wherein the relevant output vector is transformed into a probability distribution over the output predictions using the SoftMax function implemented in machine learning techniques.

* * * * *